(12) United States Patent  
Loop (10) Patent No.: US 9,984,498 B2  
(45) Date of Patent: May 29, 2018

(54) SPARSE GPU VOXELIZATION FOR 3D SURFACE RECONSTRUCTION

(71) Applicant: Microsoft Technology Licensing, LLC, Redmond, WA (US)

(72) Inventor: Charles T. Loop, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 283 days.

(21) Appl. No.: 14/256,880

(22) Filed: Apr. 18, 2014

(65) Prior Publication Data

US 2015/0022521 A1    Jan. 22, 2015

Related U.S. Application Data

(60) Provisional application No. 61/847,445, filed on Jul. 17, 2013.

(51) Int. Cl.
   *G06T 17/00* (2006.01)
   *G06T 15/00* (2011.01)

(52) U.S. Cl.
   CPC .......... *G06T 17/00* (2013.01); *G06T 15/005* (2013.01); *G06T 2210/52* (2013.01)

(58) Field of Classification Search
   None
   See application file for complete search history.

(56) References Cited

U.S. PATENT DOCUMENTS

| 6,990,228 | B1 * | 1/2006 | Wiles | G06T 17/10 345/419 |
| 7,640,284 | B1 * | 12/2009 | Goodnight | G06F 7/76 708/404 |

(Continued)

FOREIGN PATENT DOCUMENTS

CN    102576463 A    8/2016

OTHER PUBLICATIONS

"International Preliminary Report on Patentability Issued in PCT Application No. PCT/US2014/046584", a counterpart foreign application for U.S. Appl. No. 14/256,880, dated Jan. 18, 2016, 10 Pages.

(Continued)

*Primary Examiner* — Anh-Tuan V Nguyen
(74) *Attorney, Agent, or Firm* — Drinker Biddle & Reath LLP (57) ABSTRACT

Processes and systems described herein enable a computing device to perform voxel-based three-dimensional (3D) reconstruction modeling using parallel graphics hardware. The computing device may generate an initial low resolution voxel list. The voxels of the voxel list may be represented as index triples corresponding to the 3D spatial location of a cell within a voxel grid (e.g., {ix, iy, iz}). Based on information of input images associated with an object, the computing device may remove certain voxels that do not intersect with a surface of the object. The remaining voxels may be subdivided one or more times into a certain number of sub-voxels in parallel to generate a new voxel list. The newly generated voxel list may be tested again to determine voxels that do not intersect with the object surface. This process may repeat in part. The output voxels may be rendered as projected images.

20 Claims, 6 Drawing Sheets

(56) References Cited

U.S. PATENT DOCUMENTS

| | | | | |
|---|---|---|---|---|
| 8,217,939 | B1* | 7/2012 | Bonciu | G06T 17/00 345/419 |
| 2003/0179196 | A1* | 9/2003 | Hux | G06T 17/00 345/424 |
| 2003/0197699 | A1* | 10/2003 | Slabaugh | G06T 17/00 345/419 |
| 2004/0070583 | A1* | 4/2004 | Tsai | G06T 17/10 345/419 |
| 2005/0052452 | A1* | 3/2005 | Baumberg | G06T 7/0067 345/419 |
| 2005/0068317 | A1* | 3/2005 | Amakai | G06T 7/001 345/419 |
| 2005/0151735 | A1* | 7/2005 | Boekhorst | G06T 15/06 345/424 |
| 2005/0219245 | A1* | 10/2005 | Tao | G06T 17/20 345/424 |
| 2006/0066614 | A1* | 3/2006 | Grau | G06K 9/00201 345/423 |
| 2006/0187221 | A1* | 8/2006 | Lakare | G06T 5/50 345/424 |
| 2007/0229500 | A1* | 10/2007 | Engel | G06T 15/08 345/422 |
| 2008/0297507 | A1* | 12/2008 | Chen | G06T 17/20 345/424 |
| 2009/0022379 | A1* | 1/2009 | Tashiro | A61B 6/466 382/131 |
| 2009/0187727 | A1* | 7/2009 | Caprioli | G06F 12/0864 711/205 |
| 2009/0295794 | A1* | 12/2009 | Fan | G06F 9/5094 345/419 |
| 2010/0026712 | A1* | 2/2010 | Aliprandi | H04N 13/0011 345/629 |
| 2010/0128954 | A1* | 5/2010 | Ostrovsky-Berman | G06T 7/0081 382/131 |
| 2010/0316272 | A1* | 12/2010 | Kadir | G06T 15/08 382/128 |
| 2011/0063294 | A1* | 3/2011 | Brown | G06T 15/005 345/423 |
| 2011/0081044 | A1* | 4/2011 | Peeper | G06T 7/11 382/103 |
| 2011/0097007 | A1* | 4/2011 | Zeng | G06T 11/006 382/260 |
| 2011/0115787 | A1* | 5/2011 | Kadlec | G01V 1/345 345/419 |
| 2011/0262054 | A1* | 10/2011 | Benson | G01N 23/046 382/275 |
| 2011/0299745 | A1* | 12/2011 | Roberts | G06T 7/0083 382/128 |
| 2012/0194516 | A1 | 8/2012 | Newcombe et al. | |
| 2012/0226946 | A1* | 9/2012 | Arndt | G06F 11/3636 714/38.1 |
| 2013/0046951 | A1* | 2/2013 | Jones | G06F 12/023 711/171 |
| 2013/0176311 | A1* | 7/2013 | Wu | G06T 17/00 345/424 |
| 2013/0195330 | A1* | 8/2013 | Kim | G06K 9/00201 382/128 |
| 2014/0176545 | A1* | 6/2014 | Laine | G06T 17/00 345/424 |
| 2014/0267264 | A1* | 9/2014 | Crassin | G06T 15/08 345/424 |

OTHER PUBLICATIONS

Aguiar, et al., "Performance Capture from Sparse Multi-View Video" Journal of ACM Transactions on Graphics, vol. 27, Issue 3, Aug. 2008, 10 pages.

Ajmera, et al., "Fast, Parallel, GPU-Based Construction of Space Filling Curves and Octrees" Proceedings of the Symposium on Interactive 3D Graphics and Games, Feb. 2008, 1 page.

Benson, et al., "Octree Textures" Proceedings of the 29th Annual Conference on Computer Graphics and Interactive Techniques, Jul. 2002, 6 pages.

Blelloch, "Vector Models for Data-Parallel Computing", Book of Vector Models for Data-Parallel Computing, Aug. 1990, 268 pages.

Carranza, et al., "Free-Viewpoint Video of Human Actors" Journal of ACM Trasactions on Graphics, vol. 22, Issue 3, Jul. 2003, 9 pages.

Crassin, et al., "Gigavoxels Ray-Guided Streaming for Efficient and Detailed Voxel Rendering" Proceedings of Symposium on Interactive 3D Graphics and Games, Feb. 2009, 8 pages.

Crasin, et al., "Octree-Based Sparse Voxelization Using the GPU Hardware Rasterizer", OpenGL Insights, Jul. 2012, 18 pages.

Curless, et al., "A Volumetric Method for Building Complex Models from Range Images", Proceedings of the 23rd Annual Conference on Computer Graphics an Interactive Techniques, Aug. 1996, 10 pages.

Eisemann, et al., "Floating Textures" Computer Graphics Forum, vol. 27, Issue 2, Apr. 2008, 10 pages.

Eisemann, et al., "Single-Pass GPU Solid Voxelization for Real-Time Applications", Proceedings of Graphic Interface, May 2008, 8 pages.

Eisenacher, et al., "Real-Time View-Dependent Rendering of Parametric Surfaces", Proceedings of the Symposium on Interactive 3D Graphics and Games, Feb. 2009, 7 pages.

Greene, et al., "Hierarchical Z-Buffer Visibility", Proceedings of the 20th Annual Conference on Computer Graphics and Interactive Techniques, Sep. 1993, 7 pages.

Harris, et al., "Parallel Prefix Sum (Scan) with Cuda", Book of GPU Gems 3, Aug. 2007, 18 pages.

Hornung, et al., "Hierarchical Volumetric Multi-View Stereo Reconstruction of Manifold Surfaces based on Dual Graphic Embedding", IEEE Computer Society Conference on Computer Vision an Patteron Recognition, vol. 1, Jun. 2006, 8 pages.

Hornung, et al., "Interactive Pixel-Accurate Free Viewpoint Rendering from Imaes with Silhouette Aware Sampling" Computer Graphics Forum, vol. 28, Issue 8, Dec. 2009, 13 pages.

Izadi, et al., "Kinectfusion Real-Time 3d Reconstruction and Interaction Using a Moving Depth Camera", Proceedings of the 24th Annual ACM Symposium on User Interface Software and Technology, Oct. 2011, 10 pages.

Kampe, "High-Resolution Sparse Voxel DAGs" Journal of ACM Transactions on Graphics, Jul. 2013, 8 pages.

Kniss, et al., "Octree Textures on Graphics Hardware", Proceeding of ACM SIGGRAPH Sketches, 1 page, Jul. 2013.

Kuster, et al., "Freecam a Hybrid Camera System for Interactive Free-Viewpoint Video", 16th International Workshop on Vision, Modeling, and Visualization, Oct. 2011, 8 pages.

Kutulakos, et al., "A Theory of Shape by Space Carving" International Journal of Computer Vision—Special Issue on Genomic Signal Processing, vol. 38, Issue 3, Jul. 2000, 20 pages.

Ladikos, et al., "Efficient Visual Hull Computation for Real-Time 3D Reconstruction Using CUDA", IEEE Computer Society Conference on Computer Vision and Pattern Recognition Workshops, Jun. 2008, 8 pages.

Laine, et al., "Efficient Sparse Voxel Octree" IEEE Transacitions on Visualization and Computer Graphics, vol. 17, Issue 8, Aug. 2011, 12 pages.

Laurentini, "The Visual Hull Concept for Silhouette-Based Image Understanding", IEEE Transactions on Pattern Analysis and Machine Intelligence, vol. 16, Issue 2, Feb. 1994, 13 pages.

Lefebvre, et al., "Octree Textures on the GPU" Book of GPU Gem 2, Mar. 2005, 13 pages.

Loop, et al., "Real-Time, 3-D Scene Capture and Reconstruction", Microsoft Research, May 2013, 1 page.

Maimone, et al., "Encumbrance-Free Telepresence System with Real-Time 3D Capture and Display Using Commodity Depth Cameras" 10th IEEE International Symposium on Mixed and Augmented Reality, Oct. 2011, 10 pages.

Matusik, et al., "Image-Based Visual Hulls" Proceedings of the 27th Annual Conference on the Computer Graphics and Interactive Techniques, Jul. 2000, 6 pages.

(56) References Cited

OTHER PUBLICATIONS

Patney, et al., "Real-Time Reyes-Style Adaptive Surface Subdivision", ACM Transactions on Graphics, vol. 27, Issue 5, Dec. 2008, 8 pages.
Rauwendaal, et al., "Hybrid Computational Voxelization Using the Graphics Pipeline" Journal of Computer Graphics Techniques, vol. 2, Issue 1, Mar. 2013, 23 pages.
Schick, et al., "Real-Time GPU-Based Voxel Carving with Systematic Occlusion Handling", Proceedings of the 31st DAGM Symposium on Pattern Recognition, Sep. 2009, 10 pages.
Schwarz, et al., "Fast Parallel Surface and Solid Voxelization on GPUs" Journal of ACM Transactions on Graphics (TOG), vol. 29, Issue 6, Dec. 2010, 9 pages.
Shiue, et al., "A Realtime GPU Subdivision Kernel", Proceedings of ACM SIGGRAPH, vol. 24, Issue 3, Jul. 2005, 6 pages.
Varadhan, et al., "Reliable Implicit Surface Polygonization using Visibility Mapping", Proceedings of the Fourth Eurographics Symposium on Geometry Processing, Jun. 2006, 11 pages.
Wilhelms, et al., "Octrees for Faster Isosurface Generation", ACM Transactions on Graphics, vol. 11, Issue 3, Jul. 1992, 27 pages.
Wyman, "Voxelized Shadow Volumes" Proceedings of the AMC SIGGRAPH Symposium on High Performance Graphics, Aug. 2011, 8 pages.
Zhang, "A Flexible New Technique for Camera Calibration" IEEE Transactions on Pattern Analysis and Machine Intelligence, vol. 22, Issue 11, Nov. 2000, 5 pages.
Zhang, et al., "Viewport a Distributed, Immersive Teleconferencing System with Infrared Dot Pattern", IEEE of Multimedia, vol. 20, Issue 1, Jan. 2013, 11 pages.
Zhou, et al., "Data-Parallel Octrees for Surface Reconstruction", IEEE Transactions on Visualization and Computer Graphics, vol. 17, Issue 5, May 2011, 13 pages.
Ahmed, et al., "3-D Reconstruction of the Human Jaw Using Space Carving," in Proceedings of IEEE 2001 International Conference on Image Processing, vol. 2, Oct. 7, 2001, 4 pages.
Written Opinion Issued in PCT Application No. PCT/US2014/046584, a foreigni counterpart application to U.S. Appl. No. 14/256,880, dated Nov. 6, 2015, 9 pages.
Culbertson, et al., "Generalized Voxel Coloring", In Lecture Notes in Computer Science, vol. 1883, Jan. 1, 2000, pp. 100-115.
PCT Search Report and Written Opinon for PCT/US2014/046584, dated Jun. 15, 2015, 12 pages.
Pieche, et al., "Interactive Hierarchical Space Carving with Projector-based Calibrations," Published on: Nov. 16, 2004, Available at: http://www.ligum.umontreal.ca/Granger-2004-IHSCPC/carving.pdf, 8 pages.
The Chinese Office Action dated May 4, 2017 for Chinese patent application No. 201480040344.3, a counterpart foreign application of U.S. Appl. No. 14/256,880.
Granger-Piche, et al., "Interactive Hierarchical Space Carving with Projector-based Callibrations", Vison, Modeling & Visualization Conference, Nov. 16, 2004, pp. 159-166.
"Office Action Issued in European Patent Application No. 14748355.6", dated Jul. 7, 2017, 10 Pages.
"Second Office Action and Search Report Issued in Chinese Patent Application No. 201480040344.3", dated Mar. 8, 2018, 11 pages.

* cited by examiner

SPARSE GPU VOXELIZATION FOR 3D SURFACE RECONSTRUCTION

REFERENCE TO PROVISIONAL APPLICATION

This patent application claims the benefit and priority to Provisional U.S. Patent Application No. 61/847,445, titled, "Sparse GPU Voxelization for 3D Surface Reconstruction", filed on Jul. 17, 2013, to the same inventor herein, the entire disclosure of which is incorporated by reference herein.

BACKGROUND

A voxel is a volume element for representing three-dimensional (3D) surface geometry. Voxels are conceptually similar to pixels, but voxels are used to represent objects in a 3D space while pixels are used to represent objects in two-dimensional (2D) images. Voxelization is a process of synthesis of voxel-represented objects, and is a popular technique used in 3D graphics. Voxels are often stored with data that indicates whether the voxel is "on" (e.g., visible) or "off" (e.g., not visible). For example, a designation for a voxel of "on" indicates the presence of solid material, while a designation for the voxel of "off" indicates empty space. Voxels may also contain attributes such as color, texture, a surface normal, or other attribute data.

Like images, a grid of voxels ("voxel grid") is characterized by its resolution (e.g., a number of voxels in the dimensions of height, width, and depth). The total number of voxels in a grid is the product of the grid's height, width, and depth. The amount of computing memory needed to store a voxel grid is proportional to the total number of voxels in the grid. Accordingly, as the resolution of the voxel grid increases linearly in each dimension, the amount of memory needed to store it grows cubically. This makes using high resolution voxel grids impractical.

One approach is to form a hierarchical tree structure beginning with a root node that corresponds to the entire volume of the voxel grid. The space savings is achieved by eliminating voxels of certain sub-trees. While this approach may reduce the amount of memory needed to represent a voxel grid, the approach requires a large amount of pointer dereferences for random access. This dramatically weakens the value of the approach.

SUMMARY

Described herein are techniques and systems for reconstructing real-time 3D models using parallel graphics hardware. Embodiments of this disclosure relate to a voxel representation and a parallel processing of voxel information.

Various embodiments of this disclosure include generating, by a commuting system, a voxel list including a number of voxels based on input images. For individual voxels of the voxel list, the computing device may determine removability of individual voxels based at least in part on information from input images. The computing system may generate a sequential list in a position corresponding to a graphics processing unit (GPU) thread identifier (ID) based on removability of the individual voxels, and generate an output list corresponding to the sequential list. In some embodiments, the computing system may perform one or more iterations to subdivide a voxel of the voxel list to generate a new voxel list. In these instances, the new voxel list may be again processed to remove voxels from the voxel list and update the output voxels corresponding to the sequential list. When the iterations are complete, the output voxels may be compacted and the output voxels may be rendered as reconstructed images.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Processes and systems described in this disclosure enable a computing device to perform voxel-based three-dimensional (3D) reconstruction modeling using parallel graphics hardware. The computing device may reconstruct a 3D model from a series of 2D projections associated with input images. To reconstruct the 3D model, the computing device may generate voxels using an initial low resolution to create a voxel list that includes the generated voxels. The voxels of the voxel list may be represented as index triples corresponding to the 3D coordinates of a voxel corner within a voxel grid (e.g., {ix, iy, iz}). The index triples may be written to a location of the voxel list corresponding to a thread identifier (ID) assigned by a graphics processing unit (GPU), and computed as a function of the thread ID. Later, the computing device may remove certain voxels, such as voxels that do not intersect with an object surface based on analysis of the input images. The remaining voxels may be subdivided one or more times into a certain number of sub-voxels in parallel to generate a new voxel list. The newly generated voxel list may be tested again to determine voxels that do not intersect with the object surface. This process may repeat until a predetermined condition is satisfied. The output voxels may be rendered as projected images.

Illustrative Environment

Figure 1:
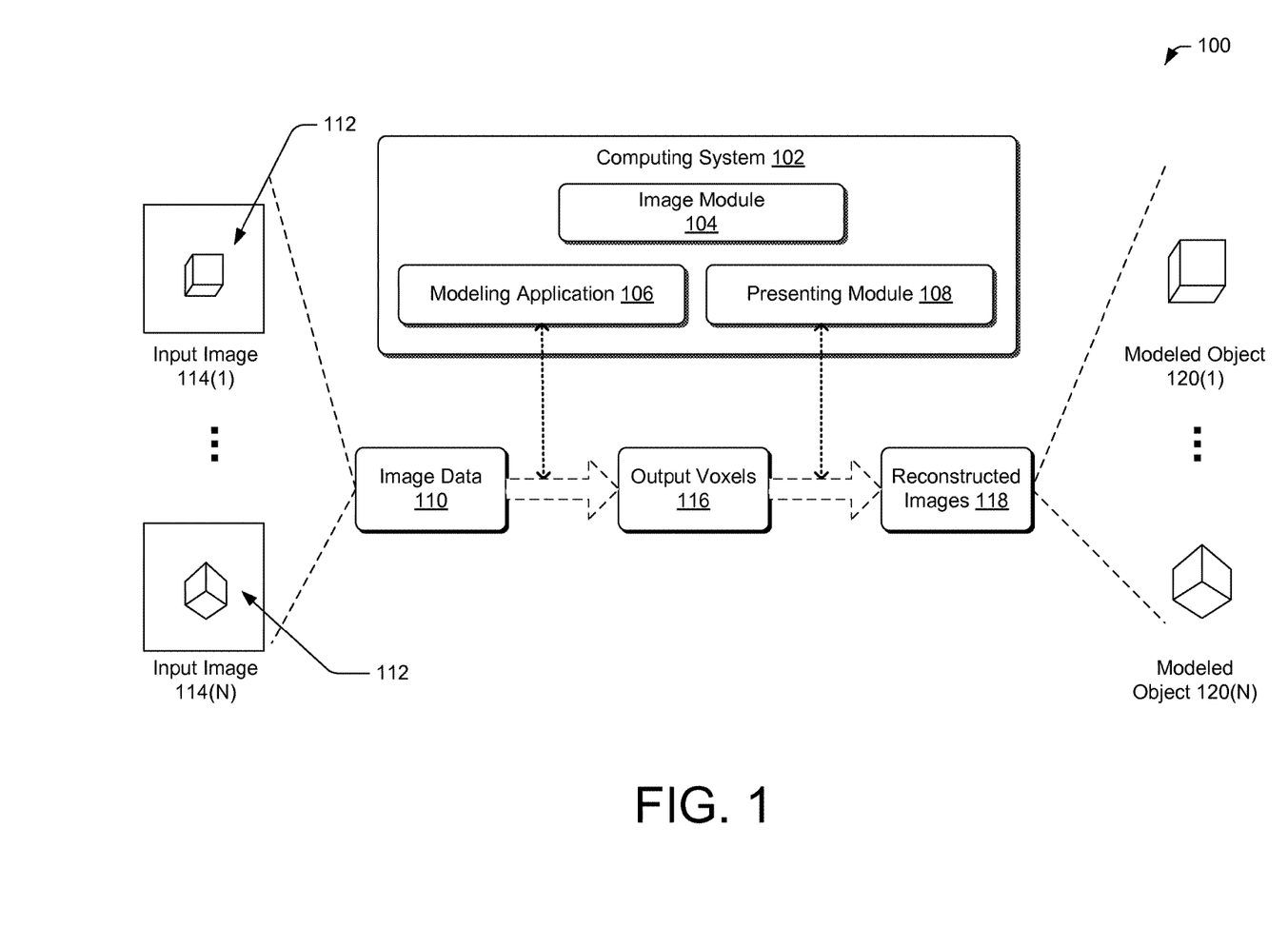
FIG. 1 is a diagram of an illustrative scheme that includes a computing architecture for reconstructing 3D models based on input images.

FIG. 1 is a diagram of an illustrative scheme 100 that includes a computing architecture for reconstructing 3D models using parallel graphics hardware. The scheme 100 includes a computing system 102. The computing system 102 may include a server or a collection of servers in a distributed configuration (e.g., cloud computing service, server farm, etc.) or non-distributed configuration.

In accordance with various embodiments, the computing system 102, in a basic configuration, may include an image module 104, a modeling application 106, and a presenting module 108, each discussed in turn.

The image module 104 may receive image data 110 associated with an object 112. In some embodiments, the image data 110 may include a set of live image streams. In these instances, for any given time, the image data 110 may include images 114(1), . . . , 114(N) (e.g., red-green-blue (RGB) images, etc.) that capture different viewpoints and perspectives of the object 112. In some instances, the images 114 may be captured from various angles with respect the object via multiple imaging sensors. For example, the image 114(1) is captured by a camera in front of the object 112, and the image 114(N) is captured by a camera on a side of the object 112. In some embodiments, the image data 110 may include filtered and/or calibrated silhouette images. In some embodiments, the image data 110 may be captured by one or more depth sensors. In these instances, the image data 110 may include depth sensor image data.

The modeling application 106 may generate voxels using an initial low resolution to create a voxel list as a basis for modeling the image data 110. In some embodiments, the modeling application 106 may represent voxels of the voxel list as an array of unsigned integer triples {ix, iy, iz} corresponding to coordinates of a voxel corner within a 3D grid. The modeling application 106 may assign a single thread per voxel and write the voxel indices to a location corresponding to a thread ID of a GPU. The indices of the voxel may be computed as a function of the thread ID. The modeling application 106 may then remove certain voxels, such as voxels that do not intersect with a surface of the object 112.

In some embodiments, the modeling application 106 may subdivide a voxel of remaining voxels (e.g., voxels that are not removed) to generate a new voxel list. The modeling application 106 may then test the new voxel list to determine whether voxels of the new voxel list intersect with a surface of the object 112 until a predetermined condition is satisfied to terminate use of additional iterations. For example, multiple iterations may be performed until the projected voxels are on a resolution order comparable to a typical resolution of a standard pixel used in conventional displays. The modeling application 106 may generate output voxels for image rendering.

The presenting module 108 may render reconstructed image(s) 118 based on the output voxels. The reconstructed images 118 may include modeled objects 120(1), . . . , 120(N). In some embodiments, the presenting module 108 may draw the output voxels to a render target and shade the target as a weighted combination of their projections into a set of calibrated RGB images. In some embodiments, the presenting module 108 may encode the output voxels 116 to generate a voxel stream and to transmit the voxel stream to cause real-time free-viewpoint viewing.

Illustrative Process

Figure 2:
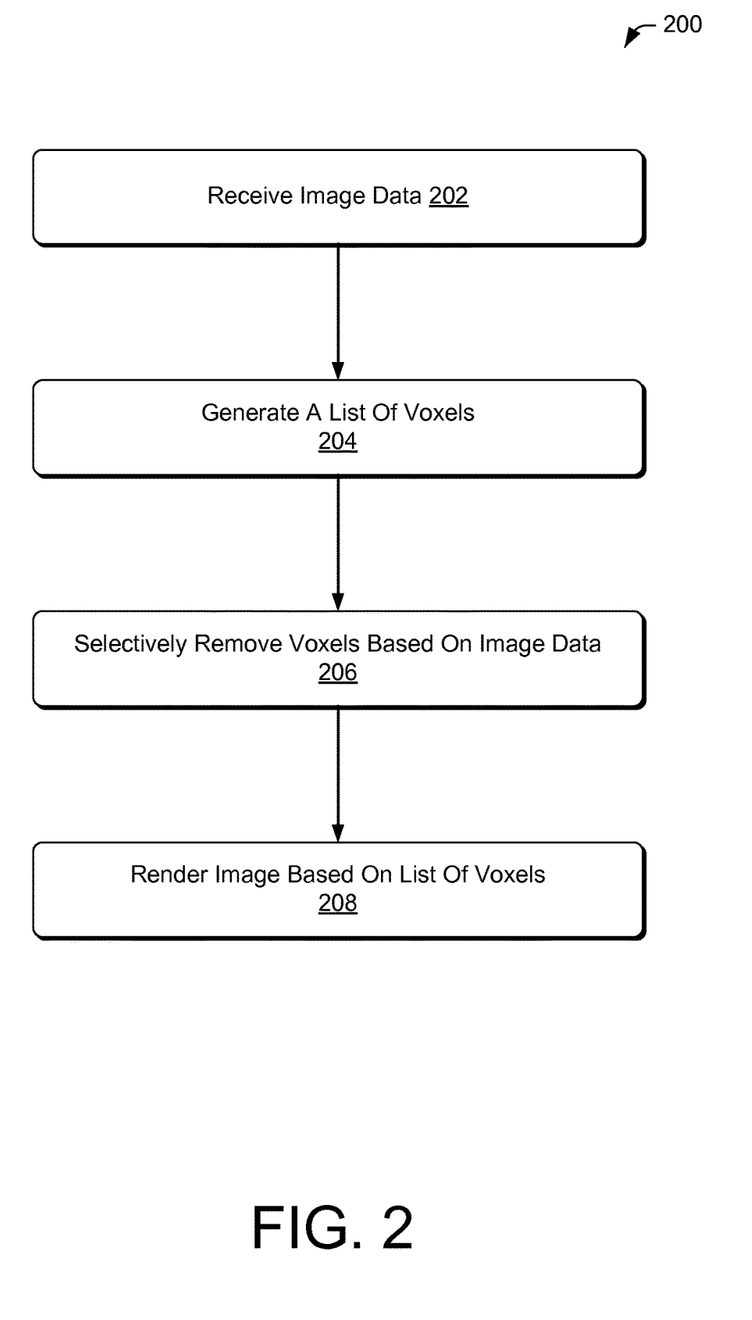
FIG. 2 is a flow diagram of an illustrative process for reconstructing 3D models based on input images.

FIG. 2 is a flow diagram of an illustrative process 200 for reconstructing 3D models based on input images. The process 200 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes (e.g., processes 400 and 500) described throughout this disclosure, in addition to process 200, shall be interpreted accordingly. The process 200 is described with reference to the scheme 100. However, the process 200 may be implemented using other schemes, environments, and/or computing architecture.

At 202, the image module 104 may receive the image data 110 associated with an object 112. In some embodiments, the image data 110 may include a set of live image streams (e.g., RGB images, silhouette images, infrared images, and etc.) captured by imaging devices (e.g., cameras, etc.). In some embodiments, the image data 110 may include depth sensor image data. The image data 110 may be associated with a known location of the imaging device to provide information about a perspective of an object recorded from the location. The image data 110 may also include configuration information and/or other metadata that describes information related to the capture of the image.

At 204, the modeling application 106 may generate a list of voxels. In some embodiments, the modeling application 106 may generate initial voxels. In these instances, the initial voxels may be represented as a list of voxel index triples, and additional attribute data (e.g., color, surface information, etc) may be stored as lists over a same index range.

At 206, the modeling application 106 may remove voxels from the list based on information from the input images (e.g., the image data 110) and calibrated transformations associated with the input images based on location information associated with the images. The modeling application 106 may generate a new voxel list including the output voxel 116 based on the remaining voxels.

At 208, the presenting module 108 may render images based on the output voxels 116. In some embodiments, the presenting module 108 may encode the output voxels 116 to generate a voxel stream and to transmit the voxel stream to cause real-time free-viewpoint viewing on a display.

Illustrative Architecture

Figure 3:
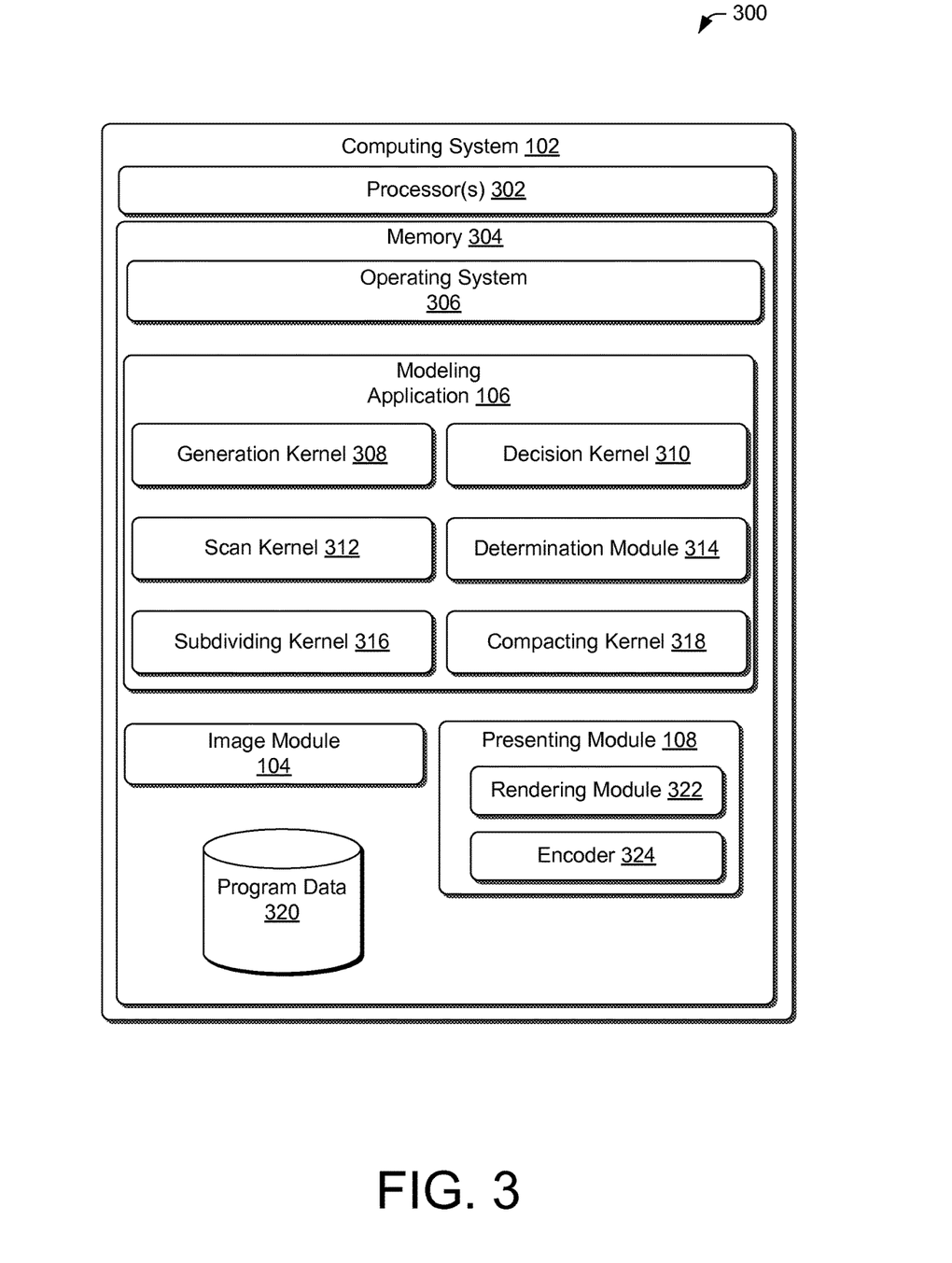
FIG. 3 is a schematic diagram of an illustrative computing architecture to enable reconstruction of 3D models using parallel graphics hardware.

FIG. 3 is a schematic diagram of an illustrative computing architecture 300 to enable reconstruction of 3D models using parallel graphics hardware. The computing architecture 300 shows additional details of the computing system 102, which may include additional modules, kernels, data, and/or hardware.

The computing architecture 300 may include processor(s) 302 and memory 304. The memory 304 may store various modules, applications, programs, or other data. The memory 304 may include instructions that, when executed by the processor(s) 302, cause the processor(s) 302 to perform the operations described herein for the computing system 102. The processors 302 may include one or more graphics processing units (GPU) and one or more central processing units (CPU).

The computing system 102 may have additional features and/or functionality. For example, the computing system 102 may also include additional data storage devices (removable and/or non-removable). Computer-readable media may include, at least, two types of computer-readable media, namely computer storage media and communication media. Computer storage media may include volatile and nonvolatile, removable, and non-removable media implemented in any method or technology for storage of information, such as computer readable instructions, data structures, program modules, program data, or other data. The system memory, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that can be used to store the desired information and which can be accessed by the computing system 102. Any such computer storage media may be part of the computing system 102. Moreover, the computer-readable media may include computer-executable instructions that, when executed by the processor(s), perform various functions and/or operations described herein.

In contrast, communication media may embody computer-readable instructions, data structures, program modules, or other data in a modulated data signal, such as a carrier wave, or other mechanism. As defined herein, computer storage media does not include communication media.

The memory 304 may store an operating system 306 as well as the image module 104, the modeling application 106, and the presenting module 108.

The modeling application 106 may include various components (e.g., modules and kernels) such as a generation kernel 308, a decision kernel 310, a scan kernel 312, a determination module 314, a subdividing kernel 316, and a compacting kernel 318.

The generation kernel 308 may generate a voxel list including multiple voxels. In some embodiments, the multiple voxels (e.g., V) may be represented as an array of unsigned integer triples {ix, iy, iz} corresponding to coordinates of a voxel corner within a 3D grid of dimensions $2^k \times 2^k \times 2^k$, where k is the level within a voxel hierarchy ($V^k$). In some instances, each voxel within the voxel hierarchy may be defined by the coordinates and level of the voxel.

In some embodiments, space for the $2^{3k}$ voxels of the grid may not be allocated. In these instances, existence of a voxel may be determined by a presence of the voxel's indices within the voxel hierarchy $V^k$. In some instances, the number of voxels (e.g., $|V^k|$) that are stored may be proportional to a surface area of an object (e.g., the object 112). For example, the program data 320 may store voxels, and a number of the stored voxels may be different from a number of voxels used to represent the object in a traditional voxel grid. In some embodiments, the maximum number of levels of the hierarchy (e.g., the depth of $V^k$) may be determined by a number of bits that is used for each unsigned integer coordinate.

While the integer coordinates of a voxel are stored internally, the modeling application 106 may convert the integer coordinates of the voxel to normalized voxel coordinates (NVC) via the transformation using Equation (1).

$$nx = \sigma_k ix - 1, ny = \sigma_k iy - 1, nz = \sigma_k iz - 1 \quad \text{EQU. (1)}$$

Here $\sigma_k = 2^{1-k}$ is the scale factor associated with level k, and an NVC voxel grid spans the cube $[-1, 1]^3$. In some embodiments, the NVC cube may be used as the world coordinate system. In these instances, the computing system 102 may maintain multiple sensors and viewing transforms with respect to these coordinates. The NVC cube may be virtually placed around a target subject, and then visible surfaces may be voxelized within an enclosed space.

In some embodiments, the generation kernel 308 may generate an initial low resolution list of voxels. For example, the generation kernel 308 may begin at level k=4 and create a $16^3$ grid containing 4096 voxels. For another example, the generation kernel 308 may begin at level k=0 with a single voxel. In this instance, certain iterations (e.g., repeats) may be required before all available cores of a GPU are fully utilized.

In some embodiments, each GPU thread may write unique voxel indices to a location corresponding to the voxel's thread ID. These indices may be computed as a function of thread ID, as illustrated in illustrative Algorithm (1).

Algorithm (1)

```
voxel v;
v.ix = threadID/256;
v.iy = (threadID/16) % 16;
v.iz = threaded % 16;
VoxelList [threadID] = v;
```

In some embodiments, the decision kernel 310 may generate a sequential list of voxel culling (e.g., removal) decisions corresponding to the voxel list. For example, the decision kernel 310 may determine a removability of some voxels of the list of voxels based on image data and a coordinate associated with the NVC cube. The decision kernel may also divide the voxels into two groups: culled (e.g., removable) and kept (e.g., irremovable). In some embodiments, using on the sequential list, individual threads of a GPU for execution may map to individual voxels. However, mapping between the individual threads and the individual voxels may be implemented using other manners (e.g., a hash table).

In some instances, the decision kernel 310 may decide whether a given voxel should be removed from the voxel list. The decision kernel 310 may have access to the image data 110 and associated coordinate transforms that project NVC voxels to image pixels. In some instances, the decision kernel 310 may write a zero (cull) or a one (keep) to a list in the position corresponding to the thread identifier (ID) of a voxel, which is discussed in more detail in illustrative embodiments below.

The list of voxels resulting after the removability decision implemented by the decision kernel 310 may be passed to the scan kernel 312. The scan kernel 312 may map the input list one-to-one to an output list in parallel. The value of the output list at position i may be defined to be a sum of all elements of the input list less than i (e.g., exclusive scan). In some instances, for each kept voxel, the scan output list provides that voxel's location within a sequential list of kept voxels. Thus, removable voxels can be eliminated from the voxel list independently and in parallel.

The determination module 314 may determine a number of iterations of modeling the image data 110. In some embodiments, the determination module 314 may determine whether a predetermined condition is satisfied. For example, the predetermined condition may be associated with the image data 110 (e.g., resolutions and/or types), the voxel hierarchy (e.g., a number of levels), the reconstructed images 118 (e.g., desired resolutions), the 3D grid (e.g., a size), and etc.

In some embodiments, in response to a determination that the number of iterations is less than a predetermined value (or another condition is or is not satisfied), the subdividing kernel 316 may subdivide a voxel into a number of sub-voxels to create a new voxel list. The new voxel list may be processed by the decision kernel accordingly. For example, the subdividing kernel 316 may subdivide each voxel into 8 sub-voxels to create a new voxel list whose resolution has doubled in all 3 dimensions. The indices of the new sub-voxels may be identified by doubling the voxel indices and adding zero or one in all 8 combinations. These 8 new sub-voxel indices may be written to a new voxel list at a location identified as 8 times the value of the scan output list in the position corresponding to the thread ID, as illustrated in illustrative Algorithm (2).

---
Algorithm (2)
---
```
if (oracleOutput[threadID] != 0)
{
    voxel vIn = VoxelListIn[threadID];
    uint baseIdx = 8*scanOutput[threadID];
    for (uint i = 0; i < 8; i++)
    {
        voxel vOut;
        vOut.ix = 2*vIn.ix + i/4;
        vOut.iy = 2*vIn.iy + (i/2)%2;
        vOut.iz = 2*vIn.iz + i%2;
        VoxelListOut[baseIdx+i] = vOut;
    }
}
```
---

In some embodiments, in response to a determination that the number of iterations is not less than a predetermined value (or another condition is or is not satisfied), the compacting kernel 318 may remove removable (e.g., culled) voxels from the voxel list. The indices of a voxel may be written to a new list at the location corresponding to the value of the scan output list at the position corresponding to the thread ID, as illustrated by an illustrative Algorithm (3).

---
Algorithm (3)
---
```
if (oracleOutput[threadID] != 0)
{ voxel vOut = VoxelListIn[threadID];
    uint baseIdx = scanOutput[threadID];
    VoxelListOut[baseIdx] = vOut;
}
```
---

The presenting module 108 may include a rendering module 322 and an encoder 324. After one or more possible iterations, the output of the compacting kernel 318 may generate a final list of voxels that intersect the desired surface. The rendering module 322 may render the reconstructed images 118 based on the image data 110. In some embodiments, the projection of the final list of voxels may be substantially the size of pixels. The rendering module 322 may render theses voxels using the graphics pipeline as splats corresponding to the axis-aligned, screen space bounding rectangles. In some embodiments, the encoder 324 may encode the output voxels 116 to generate a voxel stream and to transmit the voxel stream to cause real-time free-viewpoint viewing on a display.

Illustrative Processes

The FIGS. 4 and 5 include processes that are described with reference to the scheme 100 and computing architecture 300. However, the processes may be implemented using other schemes, environments, and/or computing architecture. Each of the processes 400 and 500 are illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 4:
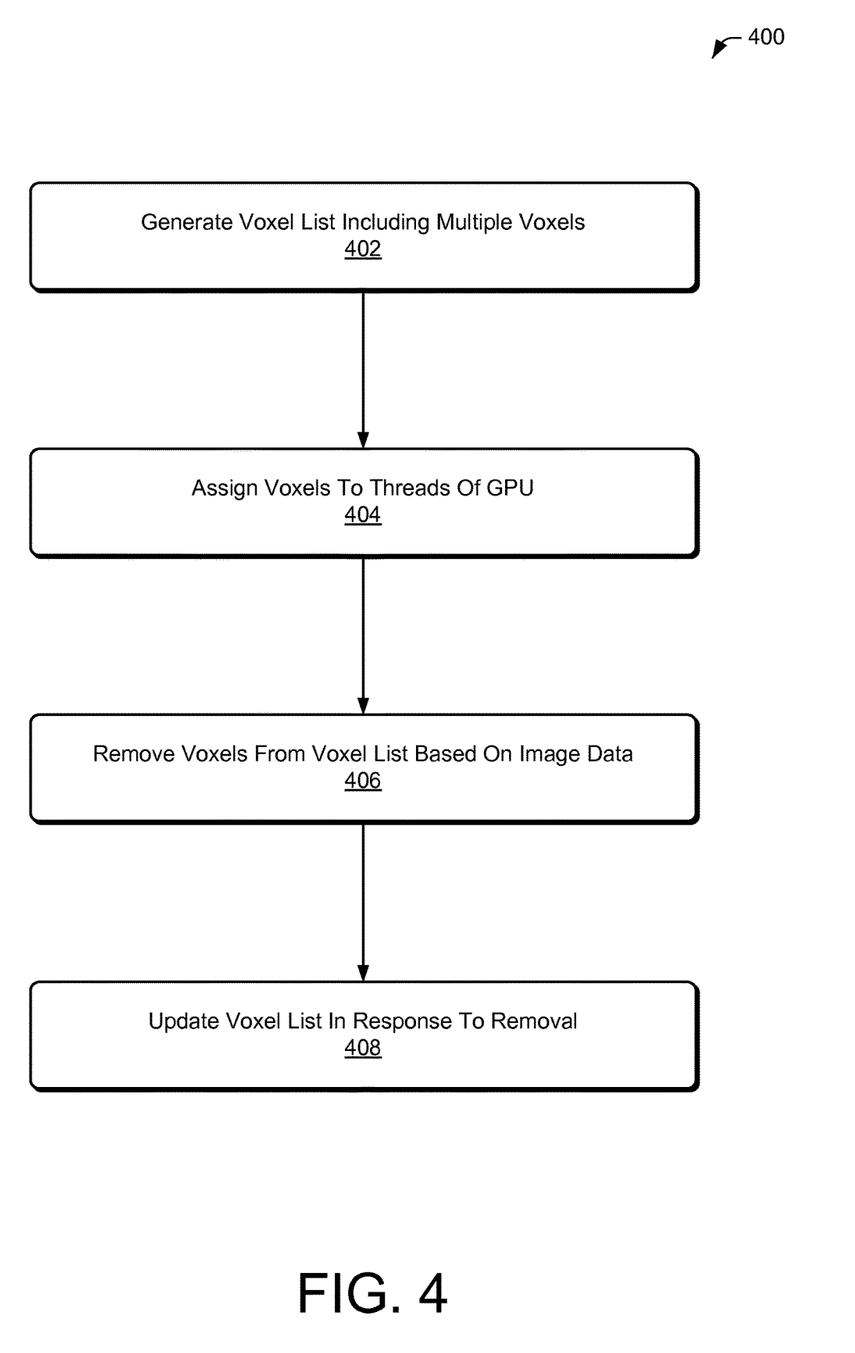
FIG. 4 is a flow diagram of an illustrative process for generating output voxels based on input images.

FIG. 4 is a flow diagram of an illustrative process 400 for generating output voxels based on input images. At 402, the modeling application 106 may generate a voxel list including multiple voxels. In some embodiments, the voxel list may initially include a predetermined number of voxels. In some instances, the initial voxel list may be in a low resolution. For example, the modeling application 106 may start with a 16×16×16 voxel grid containing 4096 voxels.

At 404, the modeling application may assign voxels to available threads of a GPU to perform parallel processing. In some instances, a number of voxels of the voxel list may be determined based on real-time hardware information (e.g., a number of cores of GPU and current status associated with the cores). For example, the number of voxels may be determined such that all available cores of the GPU may be fully utilized in a predetermined time period. In some embodiments, the modeling application 106 may assign a single thread per voxel and write the voxel indices to a location corresponding to the thread ID. The indices may be computed as a function of the thread ID.

At 406, the modeling application 106 may remove voxels from the voxel list based on the image data 110. The modeling application 106 may determine if a voxel should be removed from the representation. The modeling application 106 has access to a variety of image data and associated transformations. These transformations map voxels to image pixels.

At 408, the modeling application 106 may update the voxel list in response to the removal. The updated voxel list may be rendered as the reconstructed images 118. In some embodiments, the modeling application 106 may also divide individual voxels of the voxels in response to a certain condition, which is discussed in great detail in FIG. 5. In these instances, removability of individual voxels of the updated list may be determined again.

Figure 5:
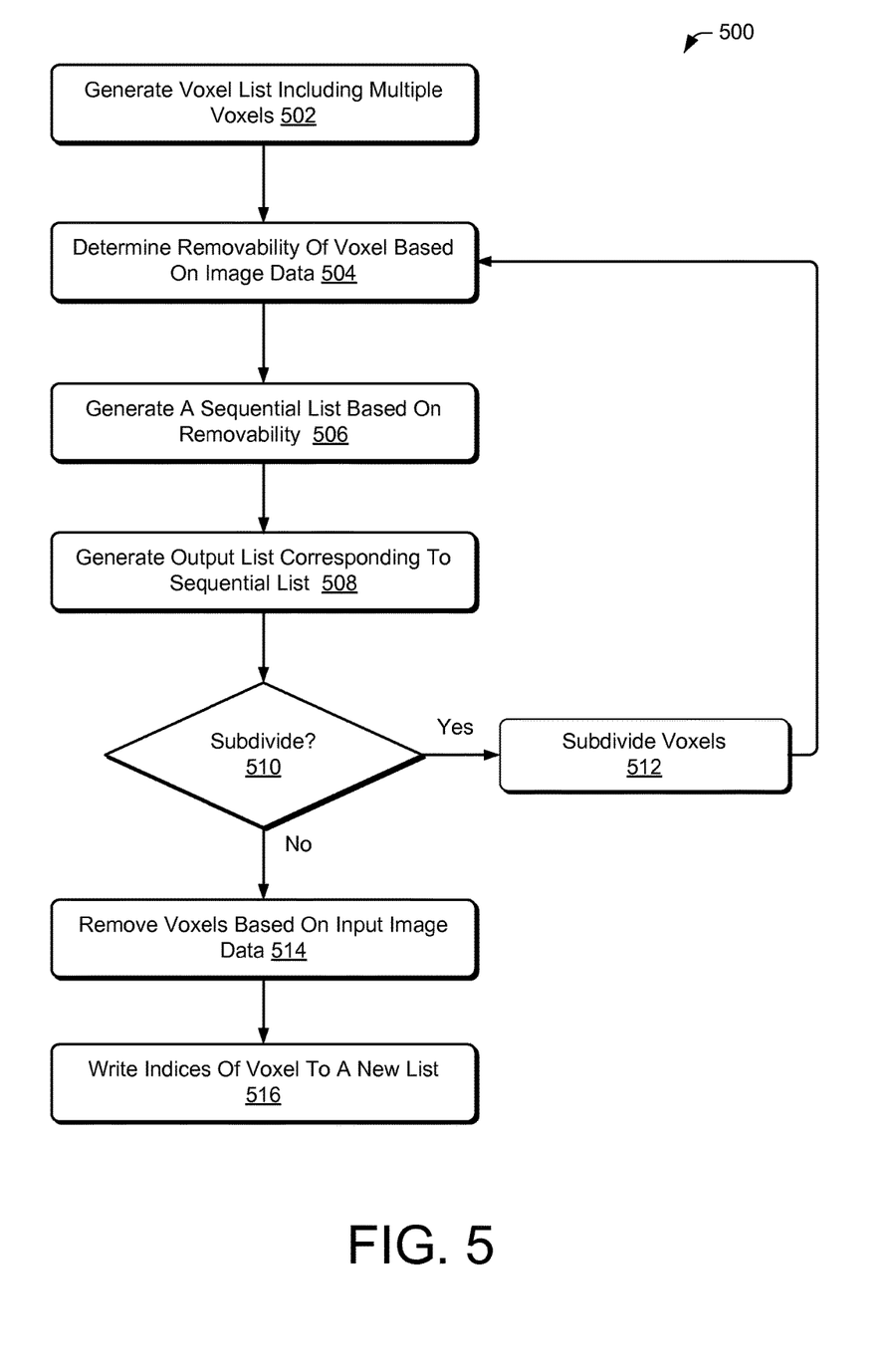
FIG. 5 is another flow diagram of an illustrative process for generating output voxels based on input images.

FIG. 5 is another flow diagram of an illustrative process 500 for generating output voxels based on input images. At 502, the generation kernel 308 may generate a voxel list including a predetermined number of voxels.

At 504, the decision kernel 310 may determine removability of individual voxels of the voxel list based on the image data 110. The decision kernel 310 may be implemented in various manners based on the nature of the image data available. The data may include color, depth, silhouette images, and/or other factors.

At 506, the decision Kernel 310 may generate a sequential list based on removability of the individual voxels. In some embodiments, the decision kernel 310 may write a zero (cull) or a one (do not cull) to the sequential list in the position corresponding to the thread ID.

At 508, the decision kernel 310 may also generate an output list corresponding to the sequential list. The sequential list (e.g., the list of voxel removability decisions) generated by the decision kernel 310 may be then sent to the scan kernel 312. The scan kernel 312 may be a prefix sum scan kernel. In some embodiments, the scan kernel 312 may be implemented as a parallel programming function implemented as a library call. The scan kernel may generate an output list whose size is identical to the input list. The value of the output list at position i, may be defined to be the sum of all elements of the input list less than i. The resulting output list is used in the following operations.

At 510, the determination module 314 may determine whether to subdivide voxels, and thus perform an iteration of part of the process 500. For example, the determination module 314 may determine whether a number of iterations performed reaches a predetermined value (e.g., no further subdivision after maximum iterations are reached), and therefore prevents further iterations. In some embodiments, the determination module 314 may determine whether a predetermined condition is satisfied (e.g., no subdivision after condition is satisfied, subdivision until condition is satisfied, etc.), which is discussed in great detail in FIG. 6. When the determination module 314 determines to subdivide voxels (i.e., the "Yes" branch of the decision operation 510), then the process 500 may advance to an operation 512.

At 512, the subdividing kernel 316 may subdivide voxels of the voxel list into a predetermined number of voxels. For example, the subdividing kernel 316 may subdivide each voxel into eight sub-voxels, creating a new grid whose resolution has doubled in all three dimensions. The indices of the new sub-voxels may be identified by doubling the voxel indices and adding zero or one in all eight combinations. These eight new sub-voxel indices may be written to a new voxel list at a location identified as eight times the value of the scanned output list in the position corresponding to the thread ID. Following the operation 512, the process may return to the operation 504 to allow another removability determination and scanning processes.

When the determination module 314 determines not to subdivide the voxels or further subdivide the voxels (i.e., the branch "No" of the operation 512), the process 500 may advance to an operation 514.

At 514, the compacting kernel 318 may opportunistically remove (e.g., cull) voxels from the voxel list. For example, one or more voxels may be removed when the voxel(s) do not intersect with a surface of the object in a particular view, as determined from analysis of the input images.

At 516, the compacting kernel 318 may write the indices of a voxel to a new list at the location corresponding to the value of the scanned output list in the position correspond to the thread ID.

Figure 6:
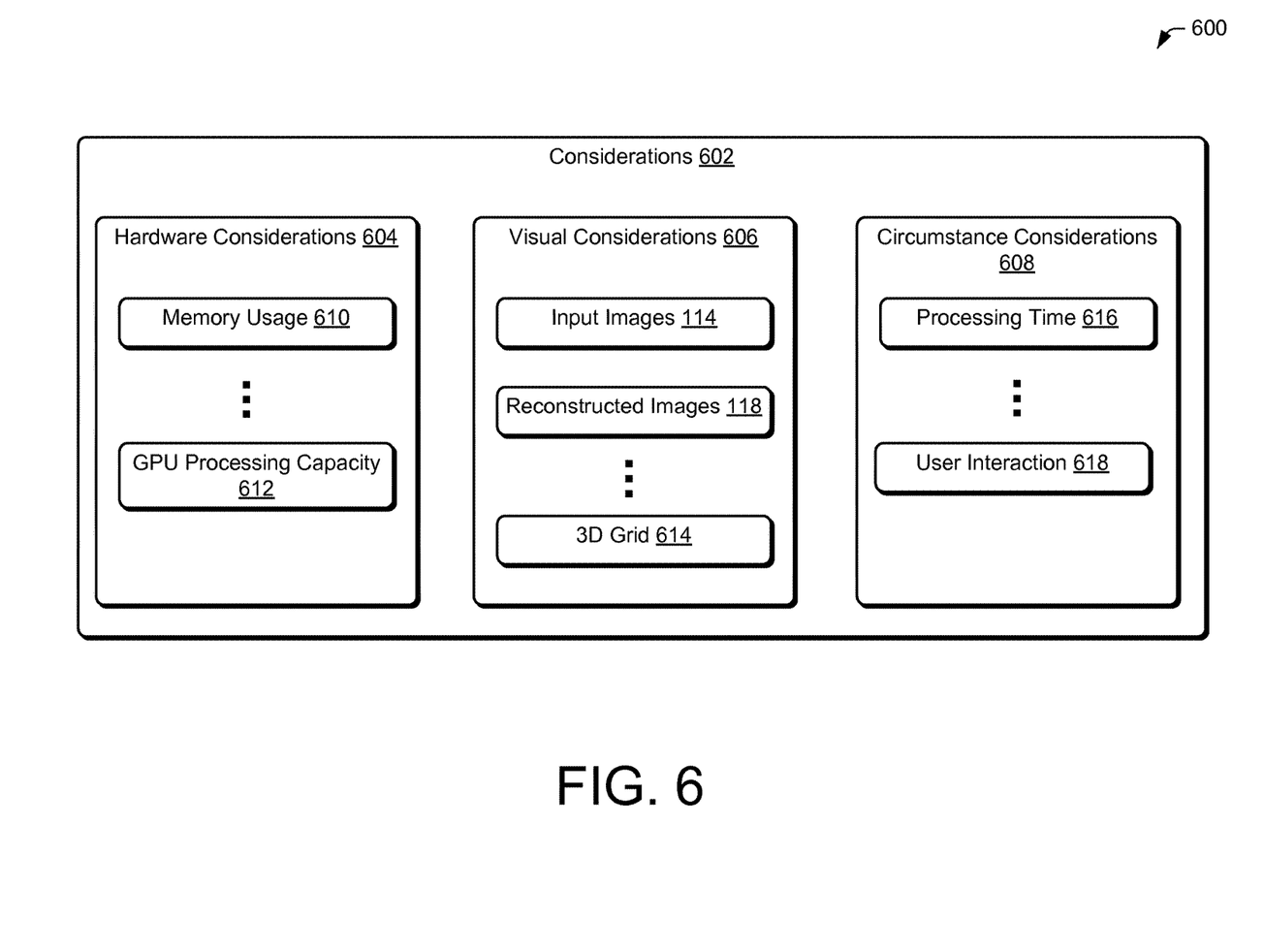
FIG. 6 is an example block diagram showing various illustrative considerations associated with a determination for voxel processing.

FIG. 6 is an example block diagram 600 showing various considerations 602 associated with the determination at the operation 510 in FIG. 5, which determines whether to subdivide or further subdivide the voxels. The determination module 314 may determine whether a predetermination condition is satisfied or not satisfied based on one or more of the considerations 602. These considerations 602 may be divided into multiple categories. In some embodiments, the considerations 602 may be divided into hardware considerations 604, visual considerations 606, and circumstance considerations 608. The determination module 314 may determine whether a condition is satisfied or not satisfied based on one or more of the considerations 602 from one or more categories.

The hardware considerations 604 may be states of hardware associated with the computing system 102. For example, the hardware consideration 604 may include current memory usage 610, GPU processing capacity 612, and other hardware considerations (e.g., capacity, specification, etc.). The visual considerations 606 may be associated with the input images 114 (e.g., resolutions and/or types), the reconstructed images 118 (e.g., desired resolutions), a 3D grid 614 (e.g., a level of the voxel hierarchy), and other possible visual considerations. The circumstance considerations 608 may be associated with a processing time 616 to complete the process 500 (including any iterations), results of user interaction 618 (e.g., user input, user manipulation of imagery, movement of object, etc.), and other possible circumstance considerations. For example, fewer iterations of the process 500 may reduce a time required to render the output voxels 116. The user interaction 618 may be associated with whether a user input is received. For example, the computing system 102 may detect continuous user inputs, the computing system 102 may perform fewer iterations to reduce time to render the output voxels 116.

Illustrative Embodiments

The following is a non-limiting example of an implementation of sparse voxelization as disclosed above. Although one example is provided below, sparse voxelization may be performed using other specific techniques, equations, and or algorithms, consistent with the framework provided above.

The computing system 102 may voxelize an object surface that corresponds to a smoothed visual hull of the object as captured by a collection of n sensors (e.g., cameras). This surface may be formed as the product of n filtered silhouette images. Suppose that $I_i: \mathbb{R}^2 \rightarrow [0, 1]$ denotes the filtered silhouette images as captured from a camera i. Further, suppose that $C_i: \mathbb{R}^3 \rightarrow \mathbb{R}^2$ is the projective transform from NVC space to image space associated with the camera1 i. As results, the product of silhouette images may be formed using the Equation (2).

$$S(p) = \Pi_i I_i(C_i(p)) \qquad \text{EQU. (2)}$$

Here, P is a point in the NVC space. The voxelized surface is $$(p) = \frac{1}{2}.$$

In addition, the gradient $\nabla S(p)$ is normal to $S(p)$. If the silhouette images $I_i$ are smooth, then $\nabla S(p)$ provides a smooth normal field over $$(p) = \frac{1}{2}.$$

Silhouette Image Acquisition and Filtering

Chroma keying may be used to segment foreground and background pixels. Foreground pixels may be assigned a value of zero, while background pixels may be assigned a value of one. In some embodiments, raw Bayer pattern data may be uploaded to the GPU each frame, and these data may be stored in a 2D texture array. Since Bayer pattern data is only 8 bits per pixel, significant camera bus and CPU/GPU data bandwidth are reduced. A single compute kernel may be invoked to simultaneously remove radial lens distortion, demosaic, and chroma key from the image data to produce calibrated silhouette images.

Then, these images may be filtered using a separable Gaussian kernel with unit integral. Increasing the width of this kernel may increase the amount of blur in the silhouette images, resulting in a smoother surface S(p). While separability is not necessary, it may greatly increase convolution performance on the GPU since an entire image row/column may fit within shared memory using a thread block per row/column strategy.

Visual Hull Decision Making

The decision kernel 310 may be assigned a single thread per voxel, and each voxel culling decision may be independent of any other. The decision kernel 310 has access to the n filtered silhouette images, as well as n mip pyramids used to accelerate and bound voxel/silhouette coverage queries. In addition, the decision kernel 310 knows about the n coordinate transforms from NVC space to silhouette image space, as well as the coordinate transform from NVC space to screen space for the novel view currently being generated.

The decision kernel 310 makes a binary culling decision, based on whether or not a given voxel intersects the surface $$S(p) = \frac{1}{2}.$$

Accordingly, a voxel will intersect the surface if $$S(p) > \frac{1}{2}, \text{ and } S(p) < \frac{1}{2}$$

for some points $p_1$ and $p_2$ within the voxel. Bounds on the value of $S(p)$ may be identified over all points p within the voxel. This may be implemented by finding bounds on the projection of a voxel into each filtered silhouette image $L_i$, and taking the product of these bounds. These bounds may be identified within images using the mip pyramids. These are used to implement the function sampleSilhouette(v, i), that will return a float2 value containing a conservative bound on the projection of voxel v into image I, as illustrated in the following illustrative Algorithm (4).

---
Algorithm (4)
---
```
DECISION = CULL;
voxel v = VoxelListIn[threadID];
if (!outsideFrustum(v))
{
    bounds = float2(1.0, 1.0);
    for (int i = 0; i < numCameras; i++)
        bounds *= sampleSilhouette(v, i);
    if (bounds.x < 0.5 && bounds.y > 0.5)
        DECISION = KEEP;
}
oracleOutput[threadID] = DECISION;
```
---

Here, bounds.x and bounds.y are the lower and upper limits of the desired bounds. In addition, the product of float2 variables is the product of their components, and the function outsideFrustum(v) returns true if a voxel v lies outside the viewing frustum of the novel view.

To accelerate processing, the decision kernel 310 may be run in a hierarchical and coarse-to-fine manner. To facilitate this, and avoid missing small features or introducing holes, an acceleration structure may be developed using a mip pyramid over each silhouette images.

Hierarchical Voxelization Acceleration Structure

In some embodiments, at each pyramid level, two channel texels are determined by finding the minimum and maximum possible values of the 4 texels at next lower level. Accordingly, a conservative bound on $L_i$ over the projection of v may be quickly found. In the function sampleSilhouette (v, i), the 8 NVC space corners of v may be projected into a silhouette image space. Next, the axis aligned bounding rectangle may be identified as minX, minY, maxX and maxY. The sampling level in the silhouette image mip pyramid may be determined using the following illustrative Algorithm (5).

---
Algorithm (5)
---
floor(log2(max(maxX −minX, maxY −minY)));
---

At this level, the bounding rectangle of v may cover at most a 2×2 block of texels. These texels may be sampled at the corners of the axis aligned bounding rectangle. The minimum and maximum of these values indicate a conservative bound on the value of $I_i(C_i(p))$, for all p within a voxel. By taking the product of the minimums (similarly maximums) over the images, a conservative bound on the value of $S(p)$ may be obtained for all p within a voxel. This means that small features or create holes may not be missed in the voxelization, since the bounds are conservatively correct. Furthermore, the silhouette image space acceleration structure greatly reduces the amount of computation and data accesses needed by the decision kernel 310 to make a culling decision for a given voxel. The n image pyramids may be generated by a compute kernel that is launched immediately after silhouette image smoothing.

Voxel Rendering

Voxels may be rendered as screen space bounding rectangle splats. The voxels may be projected to screen space, their axis aligned bounding rectangles may be identified, and these quads as a pair of triangles may then be rendered. For typical views that include the upper body and head of the capture subject, giga voxel resolution splats project to roughly the size of a pixel at HD resolution. In some embodiments, GPU rasterization may be optimized for such single pixel quads.

The computing system 102 may texture voxel splats by weighting the contribution of the voxel's projection into each of the color images. The weighting may be determined as the product of two weight terms: a view dependent weight, and a normal dependent weight. The algorithm below shows how these weights may be computed. The variable VtoEye represents the unit vector from the voxel center to the novel view eye point, Normal is the unit normal to the surface at the voxel center, and VtoCamera[i] is the unit vector from the voxel center to the position of camera I, as illustrated in the following illustrative Algorithm (6).

---
Algorithm (6)
---
```
dotV = dot(VtoEye, VtoCamera[i]);
dotN = dot(Normal, VtoCamera[i]);
weightV = dotV>0.0 ? pow(dotV, 4) : 0.0;
vv weightN = dotN>0.0 ? pow(dotN, 4) : 0.0;
weight[i] = weightV * weightN;
```
---

Finally, the values of weight are normalized by dividing by their sum. The calls to pow( ) in the code above helps to reduce artifacts in transitions between dominant textures.

CONCLUSION

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

What is claimed is:

1. A computer-implemented method for three-dimensional (3D) model reconstruction, the method comprising:
   receiving input images that include multiple two-dimensional (2D) images of an object from various perspectives;
   generating a list of voxels that reconstruct a 3D model of the object based at least in part on the input images of the object, the list of voxels including multiple voxels;
   assigning individual voxels of the multiple voxels to a thread identifier (ID) associated with a graphics processing unit (GPU), wherein indices of the individual voxels are associated with a location of the list of voxels corresponding to its thread ID;
   iteratively performing the following until a predetermined condition is satisfied:
      determining that an individual voxel of the multiple voxels is removable based on the individual voxel being identified as not intersecting with a surface of the object based on analysis of the input images;
      storing a designation of removability of the individual voxel in a sequential list corresponding to the list of voxels, the designation of removability indicating that the individual voxel is to be removed; and
      determining whether the predetermined condition is satisfied, the predetermined condition being based on one or more of a GPU processing capacity, a level of voxel hierarchy of the list of voxels, and a user interaction with the 3D model of the object;
   in response to determining the predetermined condition is satisfied, removing one or more voxels from the list of voxels to generate output voxels that exclude each individual voxel in the sequential list having the stored designation of removability; and
   rendering the 3D model using the output voxels.

2. The computer-implemented method of claim 1, wherein the multiple voxels are represented as a list of integer triples corresponding to coordinates of a voxel corner within a 3D grid.

3. The computer-implemented method of claim 1, wherein the predetermined condition is based on at least the GPU processing capacity.

4. The computer-implemented method of claim 1, further comprising:
   in response to a determination that a predetermined condition is not satisfied, subdividing at least a portion of the individual voxels into a predetermined number of voxels to update the list of voxels.

5. The computer-implemented method of claim 1, further comprising updating the sequential list using a prefix sum scan prior to removing the individual voxel from the list of voxels.

6. The computer-implemented method of claim 1, further comprising:
   encoding the output voxels; and
   transmitting the encoded output voxels to cause a free-viewpoint display.

7. The computer-implemented method of claim 1, wherein the predetermined condition is based on at least the level of voxel hierarchy of the list of voxels.

8. The computer-implemented method of claim 1, wherein the predetermined condition is based on at least the user interaction with the 3D model of the object.

9. One or more of a solid state storage device, an optical disk or a magnetic storage device storing computer-executable instructions that, when executed on one or more processors, causes the one or more processors to perform acts comprising:
   receiving input images that include multiple two-dimensional (2D) images of an object from various perspectives;
   generating a list of voxels that reconstruct a three-dimensional (3D) model of an object based at least in part on input images of the object, the list of voxels including multiple voxels, wherein indices of the individual voxel are associated with a location of the list of voxels corresponding to a thread identifier (ID) assigned by a graphics processing unit (GPU);
   iteratively performing the following until a predetermined condition is satisfied:
      determining removability of an individual voxel of the multiple voxels based on whether the individual voxel intersects with a surface of an object associated with multiple input images;
      storing a designation of the removability of the individual voxel in a sequential list corresponding to the list of voxels, the designation of removability indicating that the individual voxel is to be removed; and
      determining whether the predetermined condition is satisfied, the predetermined condition being based on one or more of a GPU processing capacity, a level of voxel hierarchy of the list of voxels, and a user interaction with the 3D model of the object; and
   in response to determining the predetermined condition is satisfied, removing one or more voxels from the list of voxels based on the designation of the removability in the sequential list to generate output voxels.

10. The one or more of solid state storage device, optical disk or magnetic storage device of claim 9, wherein the multiple voxels are represented as a list of integer triples corresponding to coordinates of a voxel corner within a 3D grid.

11. The one or more of solid state storage device, optical disk or magnetic storage device of claim 9, wherein the acts further comprise:
   updating the sequential list using a prefix sum scan; and
   subdividing the individual voxel into a predetermined number of voxels to update the list of voxels after performing the prefix sum scan.

12. The one or more of solid state storage device, optical disk or magnetic storage device of claim 9, wherein the predetermined condition is based on at least the GPU processing capacity.

13. The one or more of solid state storage device, optical disk or magnetic storage device of claim 9, wherein the acts further comprise rendering a reconstructed image using the output voxels.

14. The one or more of solid state storage device, optical disk or magnetic storage device of claim 9, wherein the predetermined condition is based on at least the user interaction with the 3D model of the object.

15. A computing system comprising:
   one or more processors; and
   memory storing computer-executable instructions that, when executed on the one or more processors, causes the one or more processors to perform acts comprising:
      generating a list of voxels including multiple voxels, an individual voxel of the multiple voxels corresponding to a thread identifier (ID) assigned by a graphics processing unit (GPU), wherein indices of the individual voxels are associated with a location of the list of voxels corresponding to its thread ID;

iteratively performing the following until a predetermined condition is satisfied:

determining removability of at least one voxel of the multiple voxels based on whether the at least one voxel intersects with a surface of an object associated with multiple input images;

storing a designation of removability of the individual voxel in a sequential list corresponding to the list of voxels, the designation of removability indicating that the individual voxel is to be removed; and     determining whether the predetermined condition is satisfied, the predetermined condition being based on one or more of a GPU processing capacity, a level of voxel hierarchy of the list of voxels, and a user interaction with the 3D model of the object; and     in response to determining the predetermined condition is satisfied, removing the at least one voxel from the list of voxels to generate output voxels that exclude each individual voxel in the sequential list having the stored designation of removability.

16. The system of claim 15, wherein the multiple voxels are represented as a list of integer triples corresponding to coordinates of a voxel corner within a three-dimensional (3D) grid.

17. The system of claim 15, further comprising:
updating the sequential list using a prefix sum scan.

18. The system of claim 15, further comprising:
subdividing a voxel, which is determined to intersect with the surface of the object, into a predetermined number of smaller voxels to update the list of voxels.

19. The system of claim 15, further comprising:
rendering a reconstructed image using the output voxels.

20. The system of claim 15, wherein the predetermined condition is based on at least the GPU processing capacity.

\* \* \* \* \*